UNITED STATES PATENT OFFICE 2,255,834

METHOD OF RUBBERIZING CELLULOSE FABRICS

Joseph I. Taylor and Karl T. Schaefer, Elizabethton, Tenn., assignors to North American Rayon Corporation, New York, N. Y., a corporation of Delaware No Drawing. Application November 5, 1938, Serial No. 239,174

18 Claims. (Cl. 91—68)

This is a continuation in part of our application, Ser. No. 151,206, filed June 30, 1937, for "Thread and/or fabric" which in turn is a division of our application Serial No. 34,856, filed Aug. 5, 1935.

The present invention relates to a process of uniting rubber and regenerated cellulose. More specifically, it has to do with a new method of promoting adhesion between rubber and regenerated cellulose, such as viscose rayon, so that this cellulose with its more desirable properties, may be used to replace cotton and other natural fibres in the manufacture of automobile tires, rubber hose, rubber belts and other industrial rubber products wherein textile fibres and fabrics are used.

Some years ago it was first suggested (vide British Patent #343,617 to Suter) that artificial silk threads be substituted for natural fibres in combination with rubber, but hitherto it has been commercially infeasible to cause rubber and regenerated cellulose to adhere properly so that ideal results could be obtained.

We are of the opinion that, because both rubber particles and regenerated cellulose possess a negatively charged surface, it is practically impossible to secure sufficient adhesion between these surfaces to enable the rubber particles and the filaments or threads to unite with sufficient completeness to produce a commercially valuable product. In order to overcome this repulsion which therefore naturally exists, our novel process concerns the treatment of the cellulose surface so that mutual attraction of two oppositely charged surfaces will result and a normal adhesion may be secured. Thus, our present invention relates specifically to a process of imparting a positive charge to the surface of a regenerated cellulose to bond negatively charged rubber particles thereto.

We have, unexpectedly, found by experimentation that the adhesion of rubber particles to regenerated cellulose is greatly improved by treating said cellulose with a cation-active substance before applying said rubber particles thereto. Cation-active compounds are, in accordance with the present invention, compounds which carry an extended carbon chain in the cation. Thus, when such a compound ionizes the extended chain remains with that part of the molecule bearing the positive charge.

The general structural formula of these cation-active compounds may be expressed as

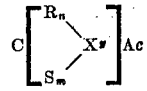

In this structure

represents the cation and Ac represents the anion. X represents a polyvalent atom, or a radical containing such an atom, capable of being linked to a negative atom or radical and at the same time to one or more positive atoms or radicals. The letter $y$ indicates the valence of the atom or radical X. The invention also contemplates the presence of more than one atom symbolized by X in the cation. In this event one or more of the X atoms may be linked to surface-active groups and to surface-inactive atoms or radicals as described herein. S designates the radical or radicals inducing cation-activity, which are linked directly to the polyvalent atom of X. S may include one or more of the same or different aliphatic, carbocyclic and heterocyclic radicals and the letter $m$ is a positive whole number indicating the total number of such radicals. The radical or radicals S should be such that when linked to X it or they will provide, in an ionizing solvent, a surface-active cation. R may be hydrogen and one or more of the same or different aliphatic, carbocyclic or heterocyclic radical or radicals which are distinguished from those of S in that they do not induce surface-activity into the cation. The letter $n$ is a positive whole number or zero and indicates the total number of such radicals and/or hydrogen atoms. This number $n$ also indicates the number of valences of the atom of X which remain available to be saturated by inactive atoms or radicals of the cation.

The letter A represents an innocuous anion, i. e., an anion having no surface-activity or at least less surface activity than the cation. This anion is linked directly to the polyvalent atom of X and may be an atom or an inorganic or organic radical. The letter C is a whole number indicating the valence of the anion. The letter C outside of the bracket is a whole positive number indicating the number of cations linked to the anion. In the examples given herein C equals c and the sum of n and m equals y—1, and it is to be understood that all compounds of the aforementioned general structure have the character of bases (wherein A would be a hydroxyl group) or their salts, including acid salts.

The more important cation-active compounds which may be used in accordance with the present invention are the bases or their salts, such as may be derived from pentavalent nitrogen, and further the sulphonium, phosphonium, stibonium, etc., bases and their salts. Thus, we contemplate the use of cation-active "onium" compounds having the structure set forth above. The polyvalent atom of X in this structural formula is in these compounds nitrogen, sulphur, phosphorus, arsenic, antimony, etc. The quaternary ammonium compounds are examples of compounds containing such an atom, nitrogen being the polyvalent atom. Pyridinium compounds are examples of compounds in which the polyvalent atom, nitrogen, is contained in a radical, the radical being the pyridine ring ($C_5H_5N$) having a valence of two. Other radicals containing the polyvalent atom may, of course, be used in the place of the pyridine ring.

In the bases or their salts illustrated by the above formula the innocuous anion symbolized by A is the hydroxide, chloride, sulphate, bromide, iodide, acetate, etc. The groups inducing cation-activity symbolized by $S_m$ comprise extended chain-like structures, such as aliphatic hydrocarbon chains having six or more carbon atoms therein. Also, the extended chain-like structures may be composed of two or more benzene nuclei or other cyclic radicals, either combined directly or, for example, through a carbon or nitrogen or other linkages, with or without aliphatic chains substituted for the hydrogen in rings. The remainder of the molecule, symbolized by $R_n$ may be alkyl, aralkyl or aryl groups or other carbocyclic or heterocyclic groups and/or hydrogen atoms.

Referring now in detail to specific examples of suitable compounds, bases derived from nitrogen and their salts, for instance, certain pyridinium and quaternary ammonium compounds, have been found to be particularly suitable. The former compound may include pyridinium bases or salts having linked thereto extended aliphatic chains, containing for example 8 or more carbon atoms and preferably 12 to 20 carbon atoms. Specifically, dodecyl, hexadecyl, octadecyl, or even a lower carbon chain such as octyl may be linked to the nitrogen atom in the bases or salts of pyridinium such as pyridinium hydroxide, pyridinium sulphate or bisulphate and pyridinium bromide. Use may also be made of replacement or substitute compounds such as the analogous substitution products of pyridine known as picoline ($C_5H_4N(CH_3)$), and quinoline ($C_9H_7N$), etc., and also compounds such as piperidine, acridine, etc., and their derivatives.

An example of such a compound is the bisulphate or acid sulphate of lauryl pyridinium, having the structure:

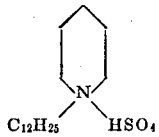

In this compound the letter X represents the pyridine radical $C_5H_5N$, including the polyvalent atom nitrogen and having a valence y of 2; S is the lauryl radical $C_{12}H_{25}$ connected directly to the polyvalent atom (nitrogen) of X, the letter m being 1. The innocuous anion A is the bisulphite radical ($HSO_4$) connected directly to the polyvalent atom of X. The valence of A is 1, and the letter C before the bracket is 1. In this compound the value of n is 0, so there would be no atom or radical R.

If the other hydrogen of the bisulphate were replaced by a second lauryl pyridinium group the innocuous anion ($SO_4$) would have a valence of 2 and the letter C outside the bracket would become 2, indicating two lauryl pyridinium groups satisfying the two valences of the anion.

In the bases or salts of picoline and quinoline the ($C_5H_4H(CH_3)$) and the ($C_9H_7N$) groups, respectively, would be the radical X containing the polyvalent atom, nitrogen.

In the quaternary ammonium compounds the same innocuous anions and surface-active groups may be linked to the pentavalent nitrogen atom as are employed with the pyridinium compounds. In this case X represents the atom nitrogen, having five valences. The three valences which are satisfied in the pyridinium compounds by $C_5H_5$ are now satisfied by alkyl, aralkyl or aryl radicals, or other carbocyclic or heterocyclic groups and/or hydrogen atoms. For instance three methyl groups may be introduced to form trimethyl-dodecyl ammonium bromide. This compound has the structure:

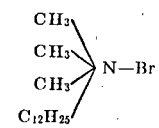

In this case R would be the methyl radical, the numeral n being 3, and A would represent an atom of bromide.

If two butyl radicals are substituted for two of the methyl radicals in the above compound, methyl-dibutyl-dodecyl ammonium bromide would be formed. In this event R would represent different radicals, namely $CH_3$ and $C_4H_9$, the total number of which would be 3.

The compound might also contain more than one dodecyl or other radical capable of inducing surface-activity in the cation. For example, one or more of the methyl radicals in the above compound might be replaced by a dodecyl radical, in which event the letter m would be 2 or more, depending upon how many methyl radicals were so replaced, and the letter n would be correspondingly decreased. If all the methyl radicals were replaced by radicals capable of inducing the surface-activity of the cation, the letter n would become zero.

As previously indicated the radicals capable of inducing the surface-activity of the cation may include aromatic or other carbocyclic or heterocyclic radicals. The following compounds are examples of compounds containing such radicals including benzene nuclei in the surface-active groups in the cation; toluene azophenyl-trimethyl ammonium iodide, benzene azophenyl-trimethyl ammonium iodide, benzene azophenyl trimethyl ammonium iodide, diphenyl azophenyl trimethyl ammonium methyl sulphate, isopropyl naphthyl trimethyl ammonium iodide. In such compounds the

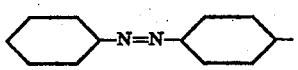

or

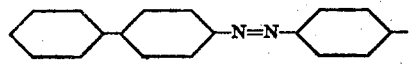

etc. represent the radicals inducing the surface-activity of the cation (S). These may be connected to a polyvalent atom as in the ammonium salts referred to or to the polyvalent element of a radical, as in the case of the pyridinium and similar compounds. It is obvious that both aliphatic radicals, for example, such as the dodecyl group, and carbocyclic or heterocyclic radicals, for example, such as the aromatic azo compounds referred to above, may be present in the compound as radicals inducing the surface-activity of the cation.

Where the innocuous anion is divalent, as in the case of a sulphate in which both hydrogens are replaced by surface-active cations, a compound of the following type may be used:

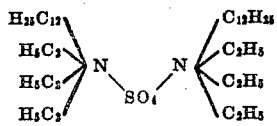

di(lauryl-triethyl ammonium) sulphate.

By the same token that the cation-active pyridinium and ammonium compounds are suitable in connection with the present invention, sulphonium, phosphonium and arsonium bases, etc., and their salts may also be used, although we prefer to use nitrogen compounds for reasons of economy. Of course, in order for this to be true, the sulphur, phosphorus or arsenic, etc., must have linked directly thereto, an innocuous anion and at least one group inducing surface-activity in the cation. It is apparent that the sulphur being tetravalent, as distinguished from the pentavalent phosphorus, arsenic and nitrogen, etc. For example, a sulphonium compound such as diethyl dodecyl sulphonium hydroxide would correspond to triethyl dodecyl phosphonium hydroxide, either of which might be used. As further examples of these types of compounds, trimethyl dodecyl phosphonium hydroxide and dipropyl lauryl sulphonium bromide may be employed.

It is also within the scope of our invention to use compounds in which the polyvalent atom of X is divalent or trivalent. The prerequisite of such an element must be that they will combine with an innocuous anion and a group inducing surface-activity in the cation.

The following are a number of compounds which may be used in accordance with the present invention:

Octyl pyridinium iodide, dodecyl pyridinium bromide, hexadecyl pyridinium iodide, octadecyl pyridinium bromide, dodecyl pyridinium chloride, dodecyl-triethyl ammonium iodide, octyl-triethyl ammonium iodide, decyl-triethyl ammonium iodide, dodecyl-triethyl ammonium iodide, hexadecyl-triethyl ammonium iodide, toluene azophenyl-trimethyl ammonium iodide, trimethyl-azobenzene ammonium iodide, diphenyl-azophenyl-trimethyl ammonium methyl sulphate, isopropyl-naphthyl-trimethyl ammonium iodide, diethyl-dodecyl sulphonium hydroxide, triethyl-dodecyl phosphonium iodide, trimethyl-dodecyl phosphonium iodide, trimethyl-dodecyl phosphonium bromide, dipropyl-lauryl sulphonium bromide, etc. Saturated as well as unsaturated radicals may be used as the radical inducing surface-activity in the cation (S) or as the inactive radical (R).

The following examples will serve to illustrate our invention.

*Example I*

A thread or filament of regenerated cellulose (viscose or cuprammonium cellulose) of the desired denier and strength is treated with a cation-active compound of the aliphatic series. For instance a so-called "Sapamine" (obtainable, for example, from the Gesellschaft fuer chemische Industrie, Basel, Switzerland), is applied to the surface of regenerated cellulose. These "Sapamines" are produced by neutralizing diethyl-amino-ethyl-oleylamid with an inorganic or organic acid. Thus, "Sapamine A" is the acetate, "Sapamine CH" the chlorhydrate and "Sapamine L" the lactate of diethyl-amino-ethyl oleylamid. Instead of forming salts of diethyl-amino-ethyl oleylamid by chemical interaction with acids, this base may also be alkylated to form cation-active compounds having the structure:

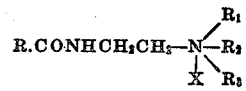

in which R represents a fatty acid radical, $R_1$, $R_2$ and $R_3$ represent any hydrocarbon residues, and X represents an innocuous anion (vide Hartmann and Kaegi, Z. f. ang. Chemie, vol. 41, pp. 127 of 1928).

The regenerated cellulose so treated will acquire a positive charge and will be capable of attracting (discharging) negatively charged rubber particles present in natural or artificial rubber latices. In this manner a strong bond between the regenerated cellulose and the rubber particles is obtained. This rubber may be subsequently vulcanized. The "Sapamines" may be replaced by any one of the cation-active compounds set forth above.

*Example II*

The regenerated cellulose is treated with an aqueous solution of a cation-active pyridinium compound, for example with lauryl pyridinium sulphate, having the structure:

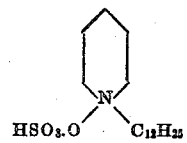

To secure a better penetration of the cation-active compound the regenerated cellulose may be swollen with alkalis, etc., before being treated, or it may be dried below its normal moisture content and then be impregnated with the cation-active substance or mixtures thereof.

*Example III*

Regenerated cellulose in loose or twisted form is dried at a temperature of about 100 to 110° C. in a desiccator. After the normal moisture content of about 10–12% has been reduced to about 5%, the cellulose is treated with an aqueous solution (foam) of a cation-active compound having the structure set forth above. Since the regenerated cellulose will attempt to regain its normal moisture content, the threads will absorb about 5 to 7% of their weight of the cation-active substance. Simultaneously, the cellulose acquires a positive charge and thus an affinity for negatively charged rubber particles. The cation-active compound adheres firmly to the cellulose and forms a film thereon. The cation-active compounds may be mixed with anion-active compounds to control the degree of cation-activity. It is also possible to use surface-active compounds which have an extended chain both in the cation and the anion, for example, triethyl-cetyl ammonium cetyl sulphate, having the structure:

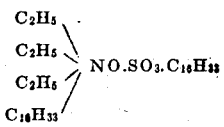

lauryl pyridinium laurate, having the structure:

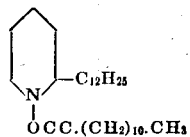

and dilauryl pyridinium sulphate, having the structure:

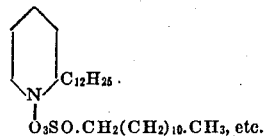

This process may be used for imparting a positive charge to any type of regenerated cellulose, such as filaments, threads, ribbons, films, staple fibre, etc., and for the bonding of any negatively charged rubber particle thereto.

Modifications of our invention will readily be recognized by those skilled in the art, and we desire to include all such modifications and variations coming within the scope of the appended claims.

We claim:

1. The process of cementing regenerated cellulose to rubber which comprises first impregnating a regenerated cellulose with a cation-active alkyl-pyridinium compound and subsequently applying a rubber thereto.

2. The process of cementing regenerated cellulose to rubber which comprises first impregnating a regenerated cellulose with a cation-active alkyl-pyridinium compound and subsequently applying a rubber latex thereto.

3. The process of cementing regenerated cellulose to rubber which comprises first impregnating a regenerated cellulose with a quaternary, cation-active alkyl-pyridinium compound and subsequently applying a rubber thereto.

4. The process of cementing regenerated cellulose to rubber which comprises first impregnating a regenerated cellulose with a quaternary, cation-active alkyl-pyridinium compound and subsequently applying a rubber latex thereto.

5. The process of cementing regenerated cellulose to rubber which comprises first impregnating a regenerated cellulose with a quaternary, cation-active alkyl-pyridinium halide and subsequently applying a rubber thereto.

6. The process of cementing regenerated cellulose to rubber which comprises first impregnating a regenerated cellulose with a quaternary, cation-active alkyl-pyridinium halide and subsequently applying a rubber latex thereto.

7. The process as in claim 1 wherein the pyridinium compound is lauryl pyridinium laurate.

8. The process as in claim 2 wherein the pyridinium compound is lauryl pyridinium laurate.

9. The process as in claim 1 wherein the pyridinium compound is dilauryl pyridinium sulphate.

10. The process as in claim 2 wherein the pyridinium compound is dilauryl pyridinium sulphate.

11. The process as in claim 1 wherein the pyridinium compound is an alkyl-pyridinium sulphate.

12. The process as in claim 2 wherein the pyridinium compound is an alkyl-pyridinium sulphate.

13. The process as in claim 5 wherein the pyridinium compound is a quaternary, cation-active alkyl-pyridinium bromide.

14. The process as in claim 6 wherein the pyridinium compound is a quaternary, cation-active alkyl-pyridinium bromide.

15. The process as in claim 5 wherein the pyridinium compound is a lauryl pyridinium halide.

16. The process as in claim 6 wherein the pyridinium compound is lauryl-pyridinium bromide.

17. The process as in claim 6 wherein the pyridinium compound is a lauryl-pyridinium halide.

18. The process as in claim 5 wherein the pyridinium compound is lauryl-pyridinium bromide.

JOSEPH I. TAYLOR.
KARL T. SCHAEFER.